United States Patent
Wang et al.

(10) Patent No.: US 8,957,937 B2
(45) Date of Patent: Feb. 17, 2015

(54) METHOD AND MEETING TERMINAL FOR ADJUSTING MEETING PLACE CAMERAS IN A REMOTE PRESENTATION MEETING SYSTEM

(75) Inventors: Fu Wang, Shenzhen (CN); Jun Chen, Shenzhen (CN); Zhihong Huang, Shenzhen (CN); Xin Tong, Shenzhen (CN); Liangping Zhang, Shenzhen (CN); Junli Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 153 days.

(21) Appl. No.: 13/805,853

(22) PCT Filed: Dec. 24, 2010

(86) PCT No.: PCT/CN2010/080267
§ 371 (c)(1),
(2), (4) Date: Dec. 20, 2012

(87) PCT Pub. No.: WO2011/160414
PCT Pub. Date: Dec. 29, 2011

(65) Prior Publication Data
US 2013/0100231 A1 Apr. 25, 2013

(30) Foreign Application Priority Data
Jun. 23, 2010 (CN) .......................... 2010 1 0212004

(51) Int. Cl.
*H04N 7/15* (2006.01)
*H04N 7/14* (2006.01)
(Continued)

(52) U.S. Cl.
CPC ............... *H04N 7/157* (2013.01); *H04N 7/142* (2013.01); *H04N 7/15* (2013.01); *H04N 5/247* (2013.01); *H04N 17/002* (2013.01)
USPC ..................... 348/14.01; 340/937; 348/14.02; 348/14.09; 348/180; 348/734; 348/806; 370/252; 382/100; 386/224; 709/204; 710/60

(58) Field of Classification Search
CPC ...... H04N 7/15; H04M 3/563; H04Q 11/0428
USPC ................. 340/937; 348/14.01, 14.02, 14.08, 348/14.05, 14.09, 180, 211.2, 211.99, 734, 348/806; 370/252; 382/100; 386/224; 709/204; 710/60
See application file for complete search history.

(56) References Cited

U.S. PATENT DOCUMENTS

| 4,791,496 | A | * | 12/1988 | Kageyama et al. | ........... 386/224 |
| 5,751,337 | A | * | 5/1998 | Allen et al. | ................ 348/14.07 |

(Continued)

FOREIGN PATENT DOCUMENTS

| CN | 1741562 A | 3/2006 |
| CN | 101404726 A | 4/2009 |

(Continued)

OTHER PUBLICATIONS

English abstract of CN101742222A, Jun. 16, 2010.
(Continued)

*Primary Examiner* — Gerald Gauthier
(74) *Attorney, Agent, or Firm* — Porter Wright Morris & Arthur LLP (57) ABSTRACT

A method and a meeting terminal for adjusting meeting place cameras in a remote presentation meeting system are disclosed. The method includes: determining a site to be tested in a meeting place (S202), wherein the site to be tested includes an intersection of the ideal boundary of depth of field of the meeting place and the ideal shooting boundary of the corresponding camera; determining the ideal imaging data of a reference object on the site to be tested (S204); acquiring, by the camera, actual imaging data of the reference object arranged on the site to be tested (S206); comparing the actual imaging data with the ideal imaging data and determining the range of needed adjustment of the camera according to the result of the comparison (S208) so as to make the actual imaging data of the reference object accord with the ideal imaging data.

16 Claims, 6 Drawing Sheets

(51) Int. Cl.
    *H04N 5/247*     (2006.01)
    *H04N 17/00*     (2006.01)

(56) References Cited

U.S. PATENT DOCUMENTS

| | | | |
|---|---|---|---|
| 6,005,492 A * | 12/1999 | Tamura et al. | 340/937 |
| 6,008,838 A * | 12/1999 | Iizawa | 348/14.09 |
| 6,091,447 A * | 7/2000 | Gershfeld | 348/180 |
| 6,380,968 B1 * | 4/2002 | Alexander et al. | 348/14.05 |
| 6,380,990 B1 * | 4/2002 | Bessel | 348/806 |
| 6,453,336 B1 * | 9/2002 | Beyda et al. | 709/204 |
| 6,614,465 B2 * | 9/2003 | Alexander et al. | 348/14.05 |
| 6,633,324 B2 * | 10/2003 | Stephens, Jr. | 348/14.09 |
| 6,654,048 B1 * | 11/2003 | Barrett-Lennard et al. | 348/180 |
| 6,654,825 B2 * | 11/2003 | Clapp et al. | 710/60 |
| 6,693,661 B1 * | 2/2004 | Vanderwilt et al. | 348/14.01 |
| 6,853,398 B2 * | 2/2005 | Malzbender et al. | 348/14.09 |
| 6,965,399 B1 * | 11/2005 | Oka et al. | 348/211.99 |
| 6,989,856 B2 * | 1/2006 | Firestone et al. | 348/14.09 |
| 7,023,470 B2 * | 4/2006 | Braun | 348/180 |
| 7,089,285 B1 * | 8/2006 | Drell | 709/204 |
| 7,095,455 B2 * | 8/2006 | Jordan et al. | 348/734 |
| 7,576,766 B2 * | 8/2009 | Cutler | 348/14.08 |
| 7,924,305 B2 * | 4/2011 | Thielman et al. | 348/14.09 |
| 8,144,186 B2 * | 3/2012 | Wagner | 348/14.09 |
| 8,203,590 B2 * | 6/2012 | Thielman et al. | 348/14.05 |
| 8,280,099 B2 * | 10/2012 | Harrison et al. | 382/100 |
| 8,305,914 B2 * | 11/2012 | Thielman et al. | 370/252 |
| 8,395,651 B2 * | 3/2013 | DeGrazia et al. | 348/14.02 |
| 8,542,266 B2 * | 9/2013 | Leviav et al. | 348/14.09 |
| 2010/0328474 A1 * | 12/2010 | Hsieh | 348/211.2 |
| 2013/0100231 A1 * | 4/2013 | Wang et al. | 348/14.01 |

FOREIGN PATENT DOCUMENTS

| | | |
|---|---|---|
| CN | 101534413 A | 9/2009 |
| CN | 101742222 A | 6/2010 |

OTHER PUBLICATIONS

English abstract of CN101404726A, Apr. 8, 2009.
English abstract of CN101534413A, Sep. 16, 2009.
English abstract of CN1741562A, Mar. 1, 2006.

* cited by examiner

METHOD AND MEETING TERMINAL FOR ADJUSTING MEETING PLACE CAMERAS IN A REMOTE PRESENTATION MEETING SYSTEM

FIELD OF THE INVENTION

The disclosure relates to the field of video meeting, and more particularly to a method and a meeting terminal for adjusting meeting place cameras in a remote presentation meeting system.

BACKGROUND OF THE INVENTION

Figure 1:
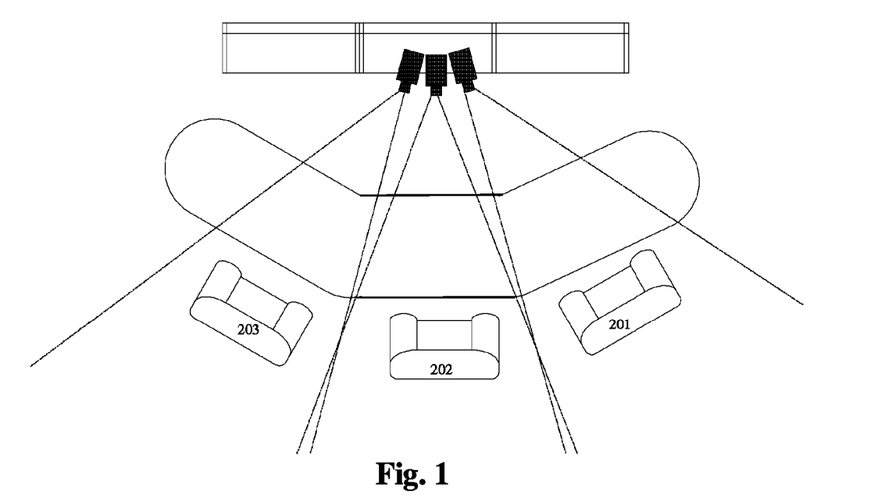
FIG. 1 is a meeting place layout diagram of a remote presentation meeting system according to the related art.

The remote presentation meeting system is an immersive virtual meeting technology. This system provides participants with good sense of immediacy, comprising life-size images, eye contact and location specific sound. In order to provide life-size images, the remote presentation generally arranges multiple meeting terminals and multiple cameras in each meeting place to transmit multiple video streams in a binding mode. The arrangement of remote presentation is as shown in FIG. 1.

During actual applications, to truly present a local meeting place in a remote meeting place, the shooting areas of the multiple cameras of the local meeting place need to be seamlessly connected. In order to realize this effect, the multiple cameras in a meeting place are generally adjusted by the following method in the related art: a meeting place manager watches the boundary of each shooting area displayed on a screen, judges the connection effect of the boundary areas visually and adjusts the cameras repeatedly according to the observed connection effect until the manager is satisfied. Such an adjusting method is highly subjective, causes relatively large adjustment error. In severe cases, such a method can even cause overlap areas or omitted areas of local meeting place images at a remote terminal. In addition, the method is time-consuming and tiring during an arranging process of a meeting place.

SUMMARY OF THE INVENTION

The disclosure provides a method and a meeting terminal for adjusting cameras in a remote presentation meeting system. The disclosure can solve the problem that the methods for adjusting cameras in the related art are highly subjective, time-consuming and tiring with relatively large adjustment error.

According to an aspect of the disclosure, a method for adjusting meeting place cameras in a remote presentation meeting system is provided, comprising: determining a site to be tested in a meeting place, wherein the site to be tested comprises an intersection of an ideal boundary of a depth of field of the meeting place and an ideal shooting boundary of a corresponding camera; determining ideal imaging data of a reference object on the site to be tested; acquiring, by the camera, actual imaging data of the reference object arranged on the site to be tested; and comparing the actual imaging data with the ideal imaging data, and determining a range of needed adjustment of the camera according to a result of the comparison, wherein the actual imaging data of the reference object is rendered to accord with the ideal imaging data of the reference object.

According to another aspect of the disclosure, a meeting terminal is provided, comprising: an ideal imaging data determination module, configured to determine ideal imaging data of a reference object on a site to be tested in a meeting place, wherein the site to be tested in the meeting place comprises an intersection of an ideal boundary of a depth of field of the meeting place and an ideal shooting boundary of a corresponding camera; an actual imaging data acquiring module, configured to acquire actual imaging data of the reference object arranged on the site to be tested, by the camera corresponding to the meeting terminal; and an adjusting module, configured to compare the actual imaging data of the reference object acquired by the actual imaging data acquiring module with the ideal imaging data of the reference object determined by the ideal imaging data determination module, and determine a range of needed adjustment of the camera according to a result of the comparison, wherein the actual imaging data of the reference object is rendered to accord with the ideal imaging data of the reference object.

By using the disclosure, the reference object is arranged at the intersection of the boundary of depth of field of the meeting place and the shooting boundary of the camera. The acquired actual imaging data of the reference object is compared with the predetermined ideal imaging data of the reference object by an image recognition method. The meeting terminal performs automatic adjustment for multiple cameras directly according to the result of the comparison to realize seamless connection of shooting areas of multiple cameras. The technical solutions provided by the disclosure make the basis of the adjustment of camera more objective and more accurate, and improve the efficiency of arranging the meeting place.

BRIEF DESCRIPTION OF THE DRAWINGS

The drawings illustrated herein provide further understanding to the disclosure and constitute a part of the application. The exemplary embodiments of the disclosure and the illustrations thereof are used for explaining the disclosure, instead of constituting an improper limitation to the disclosure. In the drawings.

DETAILED DESCRIPTION OF THE EMBODIMENTS

The disclosure will be described in detail hereinafter with reference to the drawings and in combination with the embodiments. It should be noted that, if there is no conflict, the embodiments of the application and the features in the embodiments can be combined with one another.

FIG. 1 is a meeting place layout diagram of a typical remote presentation meeting system according to the related art. FIG. 1 shows implementation of presenting seamlessly connected images of three cameras at a remote terminal. Before a meeting, management personnel of the meeting place need to adjust each camera (including adjusting the focus and the shooting angle). Hence, images at intersections of shooting areas and images at the edges can be displayed correctly at the remote terminal, and thus overlap areas and omitted areas of local meeting place images at the remote terminal can be avoided. The technical solutions for adjusting cameras provided by embodiments of the disclosure are applied to the meeting place arrangement scenario of the remote presentation meeting system above. The images shot locally in the meeting place can be displayed correctly at the remote terminal by reasonably adjusting the cameras.

Embodiment 1

Figure 2:
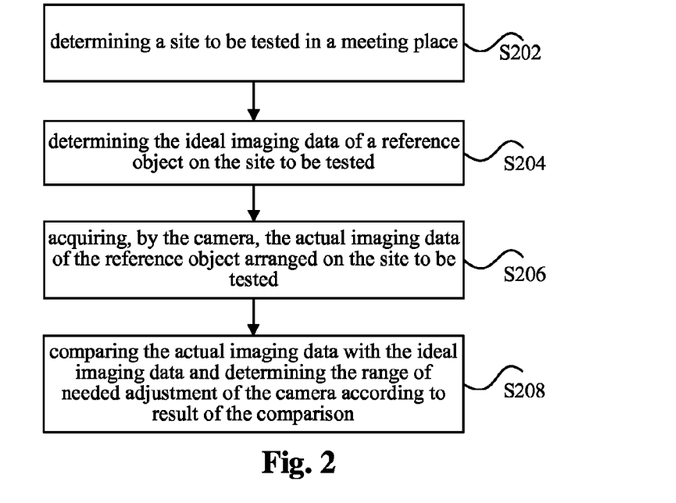
FIG. 2 is a flowchart of a method for adjusting meeting place cameras in a remote presentation meeting system according to the disclosure.

In the present embodiment, a method for adjusting meeting place cameras in a remote presentation meeting system is provided. FIG. 2 is a flowchart of a method for adjusting meeting place cameras in a remote presentation meeting system according to the first embodiment of the disclosure. The method includes the following steps.

Step S202: determining a site to be tested in a meeting place, wherein the site to be tested includes an intersection of the ideal boundary of depth of field of the meeting place and the ideal shooting boundary of the corresponding camera.

Step S204: determining the ideal imaging data of a reference object on the site to be tested.

Step S206: acquiring, by the camera, the actual imaging data of the reference object arranged on the site to be tested.

Step S208: comparing the actual imaging data with the ideal imaging data and determine the range of needed adjustment of the camera according to the result of the comparison so as to make the actual imaging data of the reference object accord with the ideal imaging data.

Generally, according to related methods for adjusting cameras, a meeting place manager watches the boundary of each shooting area displayed on a screen, judges the connection effect of the boundary areas visually and adjusts the cameras repeatedly according to the observed connection effect until the manager is satisfied. Such an adjusting method is highly subjective, causes relatively large adjustment error and is time-consuming and tiring during an arranging process of a meeting place. The method provided by the present embodiment determines the site to be tested according to the ideal depth of field of each camera of the local meeting place, and arranges the reference object on the site to be tested. After a video meeting terminal acquires an image of the reference object by a camera, image processing is performed to acquire the actual imaging data of the reference object. The actual imaging data is compared with the theoretical imaging data of the reference object. According to the result of the comparison, the camera is controlled to move up or down, left or right, and perform zoom-in operations, so as to ensure that the whole seat region arranged in the meeting place can be included in the shooting area and to enable natural connection of images of multiple cameras. Thus, the meeting place can be arranged rapidly. The method of the present embodiment greatly improves the adjusting accuracy of the cameras and increases the efficiency of arrangement of the meeting place.

During the implementation process, an appropriate "site to be tested" needs to be selected. An intersection of the ideal boundary of depth of field of the meeting place and the ideal shooting boundary of the corresponding camera may be set as the site to be tested. Since the actual depth of field of each camera can be extended unlimitedly along the depth direction and each camera is provided with a specific shooting angle, adjacent boundaries of shooting areas of adjacent cameras must have an intersection in the depth direction. During the specific implementation process, the horizontal centerlines of the seats in the last row in a meeting place can be generally selected as the ideal depth of field of each camera. The intersection of adjacent boundaries of shooting areas of adjacent cameras is controlled to be on an intersection of the horizontal centerlines of the seats in the last row so as to ensure that all seats of the meeting place are included in the image. Thus, it is ensured that images of each shooting area can be displayed as naturally connected at a remote terminal.

Figure 3:
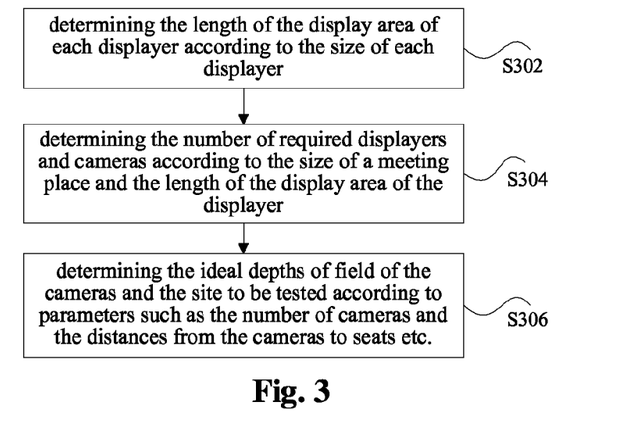
FIG. 3 is a flowchart of determining a site to be tested according to the first embodiment of the disclosure.

During the implementation process, the site to be tested may be determined by the following method, but is not limited thereby. FIG. 3 is a flowchart of determining a site to be tested according to the first embodiment of the disclosure, comprising the following steps.

Step S302: determining the length of the display area of each displayer according to the size of each displayer.

Step S304: determining the number of required displayers and cameras according to the size of a meeting place and the length of the display area of the displayer.

Step S306: according to the parameters, such as the number of cameras and the distances from the cameras to the seats etc., determining the ideal depths of field of the cameras, controlling that the intersections of shooting areas of cameras are on the boundary of depths of field, and taking the intersection of the shooting boundary of each camera and the ideal boundary of depth of field of each camera as the site to be tested.

During the specific implementation process, the size and shape of the reference object arranged on the site to be tested are preset. The ideal imaging data of the reference object is calculated according to the parameters such as the distance from the camera to the ideal boundary of depth of field, the shooting angle of the corresponding camera, and the horizontal distance of the ideal depth of field in the shooting area etc. The parameters may include, but is not limited to the ideal imaging ratio and the ideal imaging coordinates on the screen.

During the implementation process, the reference object may be placed on the site to be tested. The images of the reference object are acquired by each meeting terminal using corresponding cameras. The actual imaging data of the reference object is acquired through image processing. The actual imaging data may include, but is not limited to the actual imaging ratio and the actual imaging coordinates on the screen.

By comparing the acquired actual imaging data and the pre-calculated ideal imaging data, the camera is adjusted correspondingly. For example, if the actual imaging ratio is larger than the ideal imaging ratio, then the focus of the corresponding camera is shortened. If the actual imaging ratio is smaller than the ideal imaging ratio, then the focus of the corresponding camera is extended. After adjusting the actual imaging ratio to accord with the ideal imaging ratio, if the actual imaging coordinates depart from the ideal imaging coordinates, then the meeting terminal controls the camera to adjust the angle and height, so that the coordinates of the reference object are in the range of the ideal imaging coordinates.

The preferred method above sets the ideal shooting parameters of each camera by determining the ideal imaging data of the reference object (including the ideal imaging ratio and the ideal imaging coordinates). And the method acquires the actual shooting parameters of each camera by acquiring the actual imaging data of the reference object to provide adjustment basis for subsequent adjustment of the camera.

Preferably, determining the ideal imaging ratio of the reference object on the site to be tested comprises: determining the ideal imaging ratio of the reference object on the corresponding screen, according to the actual size of the reference object and the actual size of the screen.

During the implementation process, the meeting object may apply a piece of A4 printing paper, but is not limited thereby. If a meeting place of a remote presentation system applies a 65-inch displayer, the size of the displayer is 1434 mm*807 mm and the size of the A4 paper is 210 mm*297 mm. According to a mapping relation, it can be easily calculated that the corresponding display ratio of the A4 paper in a screen whose pixel size is 1280*720 is the pixel value of 187*265, and the corresponding display ratio of the A4 paper in a screen whose pixel size is 1920*1080 is the pixel value of 281*398.

By the preferred method above, the ideal imaging ratio of the reference object on the site to be tested can be calculated correctly.

Preferably, comparing the actual imaging data with the ideal imaging data and determining the range of needed adjustment of the camera according to the result of the comparison comprises: comparing the actual imaging ratio and the ideal imaging ratio to acquire a ratio offset vector, judging whether the ratio offset vector exceeds a ratio threshold, and if yes, determining the range of needed adjustment of the focus of the camera corresponding to the reference object according to the ratio offset vector.

During the implementation process, the acquired actual imaging ratio of the reference object is compared with the pre-calculated ideal imaging ratio of the reference object. If the result of the comparison indicates that the actual imaging ratio is larger than the ideal imaging ratio, the meeting terminal controls the camera to shorten the focus. If the result of the comparison indicates that the actual imaging ratio is smaller than the ideal imaging ratio, the meeting terminal controls the camera to extend the focus. The specific adjustment range is determined by the size of the offset vector.

By the preferred method above, it can be ensured that the focus of the camera can be adjusted to an ideal state.

Preferably, determining the ideal imaging coordinates of the reference object arranged on the site to be tested comprises: determining the ideal imaging coordinates of the reference object on the site to be tested according to the display position of the site to be tested on the corresponding screen and the ideal imaging ratio of the reference object.

After calculating the ideal imaging ratio of the reference object, the ideal imaging coordinates of the reference object arranged on the site to be tested need to be further determined according to the display position of the site to be tested on each screen. During the implementation process, the ideal imaging coordinates of the reference object are determined according to the ideal imaging ratio of the reference object and the position of the site to be tested. For example, the site to be tested is the intersection of shooting boundaries of two adjacent cameras. A piece of A4 paper is taken as the reference object. Then the ideal display positions of the A4 paper on the two screens corresponding to the two adjacent cameras are at the bottom right corner of the left screen and the bottom left corner of the right screen, and two screens respectively display a half of the A4 paper. The specific display coordinates are determined according to the coordinates reference values of the bottom right corner of the left screen and the bottom left corner of the right screen, and the ideal imaging ratio of the A4 paper on the screen.

By the preferred method above, the ideal imaging coordinates of the reference object on the site to be tested can be calculated correctly.

Preferably, comparing the actual imaging data with the ideal imaging data and determining the range of needed adjustment of the camera according to the result of the comparison comprises: comparing the actual imaging coordinates and the ideal imaging coordinates to acquire a coordinates offset vector, judging whether the coordinates offset vector exceeds a coordinates threshold, and if yes, determining the range of needed adjustment of the shooting angle of the camera corresponding to the reference object according to the coordinates offset vector.

By the preferred method above, it can be ensured that the shooting angle of the camera can be adjusted to an ideal state.

Embodiment 2

Figure 4:
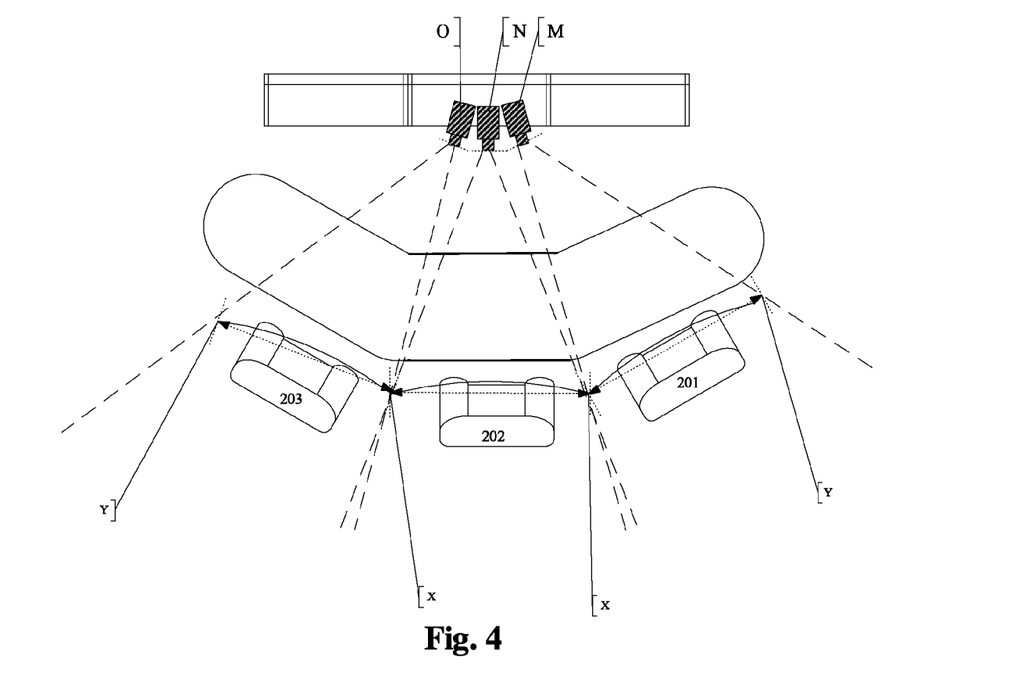
FIG. 4 is a meeting place layout diagram of a remote presentation meeting system according to the second embodiment of the disclosure.

FIG. 4 is a meeting place layout diagram of a remote presentation meeting system according to the second embodiment of the disclosure. As shown in FIG. 4, the ideal boundaries of depth of field in the scenario are the horizontal centerlines of the seats in the last row. The ideal shooting state of the camera group is that the boundaries of shooting areas of adjacent cameras intersect on the lines of depth of field. The intersection of the shooting boundary and the line of depth of field of each camera is the site to be tested which includes two types as labelled in FIG. 4: one is the intersection X of the boundaries of shooting areas of adjacent cameras; and the other type is the site to be tested Y on the shooting boundary on the outer boundaries of the meeting place.

In the meeting place layout scenario of the remote presentation system above, a process of adjusting cameras comprises the following steps.

Step S401: selecting an appropriate displayer which is required to be larger than or equal to 65 inches generally.

Step S402: the number of seats and positions thereof in the meeting place may be determined according to the planned meeting place size and the TV size.

Step S403: setting the ideal connection parameters of a meeting terminal according to the conditions above.

Step S404: placing a piece of A4 paper on the center of each theoretical intersection X of the cameras, and placing a piece of A4 paper on two boundary points Y in the direction close to the center of the meeting place.

Step S405: starting the function of meeting terminal to adjust the camera, and the meeting terminal adjusts the camera automatically.

During the specific implementation process, first the meeting terminal calculates the ideal imaging ratios and the ideal imaging coordinates of the A4 paper at point X and point Y. Each camera shoots its respective seating area. The actual imaging ratio and the ideal imaging coordinates of the A4 paper on each site to be tested are acquired after image processing. Each meeting terminal is configured to compare the actual imaging ratio of the A4 paper in its respective area with the ideal imaging ratio, compare the actual imaging coordinates of the A4 paper in its respective area with the ideal imaging coordinates, and adjust the focus and shooting angle of the cameras according to the result of the comparison.

Step S406: after each terminal performs camera adjustment once, the adjusting operator in the meeting place sits on the planned positions 201, 202 and 203 to check whether the videos are normal. If not, Step S403 is performed to readjust the cameras.

Figure 5:
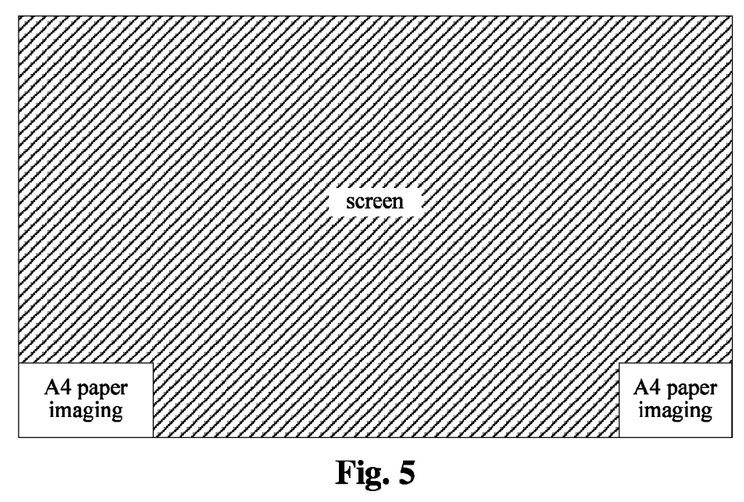
FIG. 5 is a screen display diagram according to the second embodiment of the disclosure.

During the specific adjusting process, whether the videos are normal can be checked by the following methods: taking the image of a piece of A4 paper shot by a camera O in FIG. 4 for example, the ideal position of the A4 paper displayed by a displayer corresponding to the camera is as shown in FIG. 5. The whole A4 paper is displayed on the bottom left corner and the left half of the A4 paper is displayed on the bottom right corner.

Step S407: after repeated adjustment, the layout of the remote representation meeting place can be determined.

Embodiment 3

Figure 6:
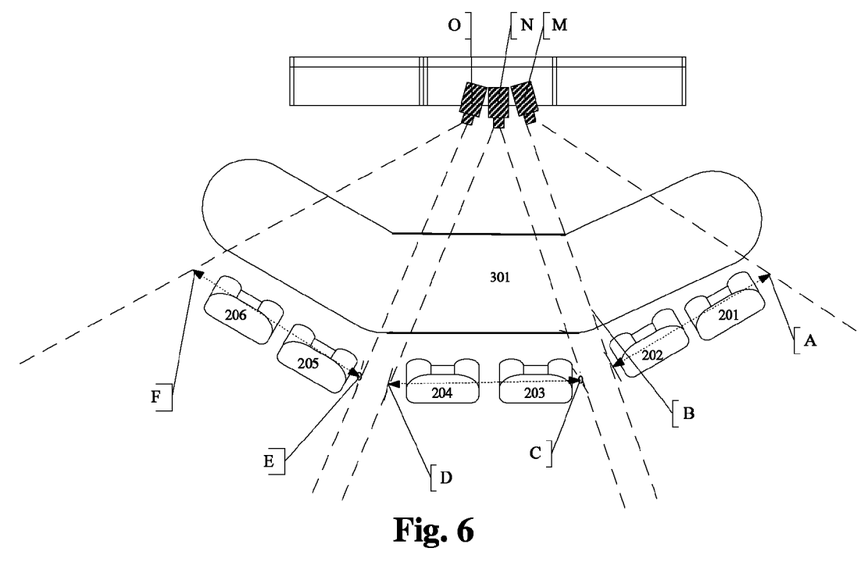
FIG. 6 is a meeting place layout diagram of a remote presentation meeting system according to the third embodiment of the disclosure.

FIG. 6 is a meeting place layout diagram of a remote presentation meeting system according to the third embodiment of the disclosure. As shown in FIG. 6, the ideal boundary of depth of field in the scenario is the horizontal centerlines of the seats in the last row. The ideal shooting state of the camera group is that the boundaries of shooting areas of adjacent cameras do not intersect on the lines of depth of field. There are gaps between the angles of view of adjacent cameras. The intersections of the shooting boundaries of the cameras and the lines of depths of field are determined as the sites to be tested, labelled as A, B, C, D, E and F in FIG. 6.

In the meeting place layout scenario of the remote presentation system above, a process of adjusting cameras comprises the following steps.

Step S601: selecting an appropriate displayer which is required to be larger than or equal to 65 inches generally.

Step S602: the number of seats and positions thereof in the meeting place may be determined according to the planned meeting place size and the TV size.

Step S603: setting the ideal connection parameters of a meeting terminal according to the conditions above.

Step S604: placing a piece of A4 paper at locations A and B respectively to adjust camera M; placing a piece of A4 paper at locations C and D respectively to adjust camera N; and placing a piece of A4 paper at locations E and F respectively to adjust camera 0.

Step S605: starting the function of meeting terminal to adjust the camera, and the meeting terminal adjusts the camera automatically.

During the specific implementation process, the meeting terminal pre-calculates the ideal imaging ratios and the ideal imaging coordinates of the A4 paper on the sites to be tested from A to F. Each camera shoots its respective seat area. The actual imaging ratio and the ideal imaging coordinates of the A4 paper on each site to be tested are acquired after image processing. Each meeting terminal is configured to compare the actual imaging ratio of the A4 paper in its respective area with the ideal imaging ratio, compare the actual imaging coordinates of the A4 paper in its respective area with the ideal imaging coordinates, and adjust the focus and shooting angle of the camera according to the result of the comparison.

Step S606: after each terminal performs camera adjustment once, the adjusting operator in the meeting place sits on the planned positions 201/202, 203/204 and 205/206 to check whether the videos are normal. If not, Step S603 is performed to readjust the cameras.

Figure 7:
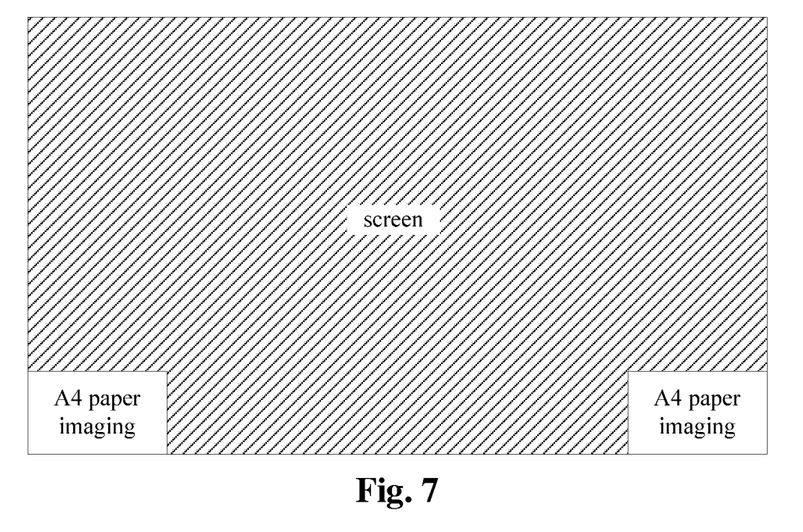
FIG. 7 is a screen display diagram according to the third embodiment of the disclosure.

During the specific adjusting process, whether the videos are normal can be checked by the following methods: taking the image of a piece of A4 paper shot by camera O in FIG. 7 for example, the ideal position of the A4 paper displayed by a displayer corresponding to the camera is as shown in FIG. 7. The whole A4 paper is displayed on the bottom left corner and the whole A4 paper is displayed on the bottom right corner.

Step S607: after repeated adjustment, the layout of the remote representation meeting place can be determined.

Embodiment 4

In the present embodiment, a meeting place terminal for adjusting a remote presentation meeting system is provided.

Figure 8:
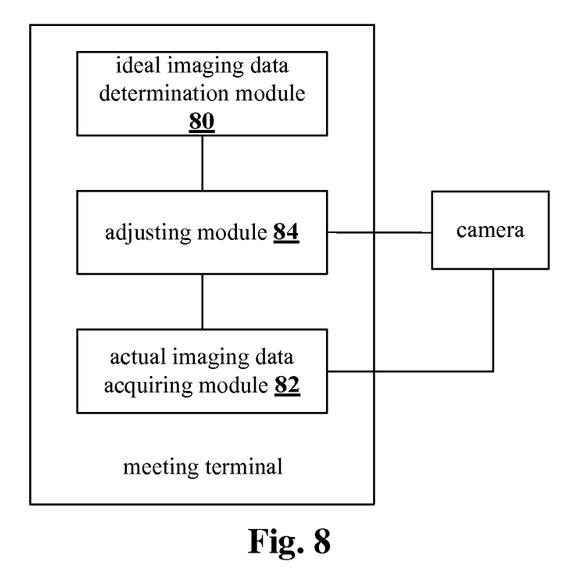
FIG. 8 is a structural diagram of a meeting terminal according to the fourth embodiment of the disclosure.

FIG. 8 is a structural diagram of a meeting terminal according to the fourth embodiment of the disclosure. The meeting terminal comprises: an ideal imaging data determination module 80, an actual imaging data acquiring module 82 and an adjusting module 84.

The ideal imaging data determination module 80 is configured to determine the ideal imaging data of a reference object on a site to be tested in a meeting place, wherein the site to be tested in the meeting place comprises an intersection of the ideal boundary of depth of field of the meeting place and the ideal shooting boundary of the corresponding camera.

The actual imaging data acquiring module 82 is configured to acquire the actual imaging data of the reference object arranged on the site to be tested, by a camera corresponding to the meeting terminal.

The adjusting module 84 is configured to compare the actual imaging data of the reference object acquired by the actual imaging data acquiring module 82 with the ideal imaging data of the reference object determined by the ideal imaging data determination module 80, and determine the range of needed adjustment of the camera according to the result of the comparison so as to make the actual imaging data of the reference object accord with the ideal imaging data.

Generally, according to related methods for adjusting cameras, a meeting place manager watches the boundary of each shooting area displayed on a screen, judges the connection effect of the boundary areas visually and adjusts the cameras repeatedly according to the observed connection effect until the manager is satisfied. Such an adjusting method is highly subjective, causes relatively large adjustment error and is time-consuming and tiring during an arranging process of a meeting place. The meeting terminal provided by the present embodiment determines the site to be tested according to the ideal depth of field of each camera which remotely presents the local meeting place and arranges the reference object on the site to be tested. After a video meeting terminal acquires an image of the reference object by a camera, the image processing is performed to acquire the actual imaging data of the reference object. The actual imaging data is compared with the theoretical imaging data of the reference object. According to the result of the comparison, the camera is controlled to move up or down, left or right, and to perform zoom-in operations, so as to ensure that the whole seating region arranged in the meeting place can be included in the shooting area. Thus, the natural connection of images shot by multiple cameras can be ensured, and the meeting place can be arranged rapidly. The meeting terminal of the present embodiment not only greatly improves the adjusting accuracy of the cameras, but also increases the efficiency of arrangement of the meeting place.

Figure 9:
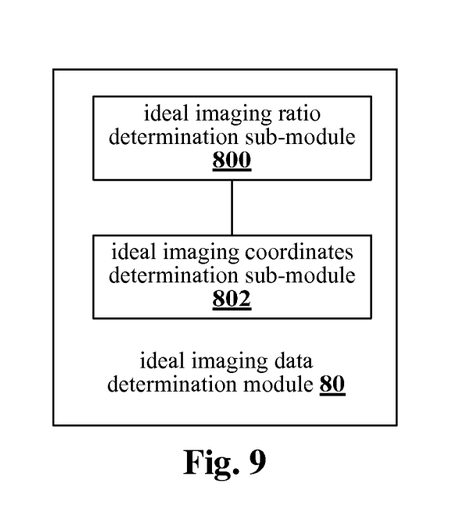
FIG. 9 is a structural diagram of an ideal imaging data determination module according to the fourth embodiment of the disclosure.

Preferably, as shown in FIG. 9, the ideal imaging data determination module 80 comprises: an ideal imaging ratio determination sub-module 800 and an ideal imaging coordinates determination sub-module 802, wherein the ideal imaging ratio determination sub-module 800 is configured to determine the ideal imaging ratio of the reference objet on the site to be tested, and the ideal imaging coordinates determination sub-module 802 is configured to determine the idea imaging coordinates of the reference object on the site to be tested.

Figure 10:
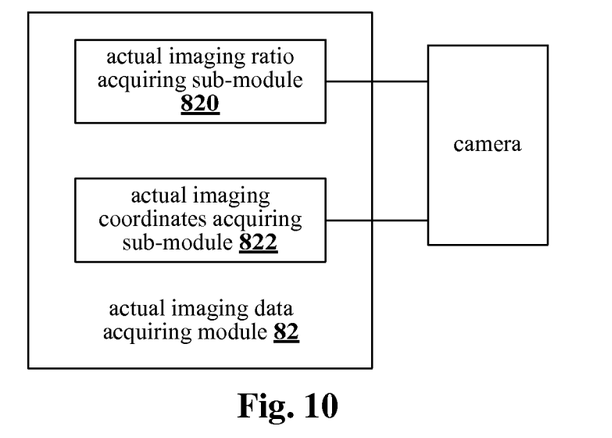
FIG. 10 is a structural diagram of an actual imaging data determining module according to the fourth embodiment of the disclosure.

Preferably, as shown in FIG. 10, the actual imaging data acquiring module 82 comprises: an actual imaging ratio acquiring sub-module 820, and an actual imaging coordinates acquiring sub-module 822, wherein the actual imaging ratio acquiring sub-module 820 is configured to acquire the actual imaging ratio of the reference object arranged on the site to be tested, and the actual imaging coordinates acquiring sub-module 822 is configured to acquire the actual imaging coordinates of the reference object arranged on the site to be tested.

The preferred meeting terminal above sets the ideal shooting parameters of each camera by determining the ideal imaging data (including the ideal imaging ratio and the ideal imaging coordinates) of the reference object, and acquires the actual shooting parameters of each camera by acquiring the actual imaging data (comprising the actual imaging ratio and the actual imaging coordinates) of the reference object, so as to prepare for acquiring adjustment basis through subsequent comparison.

Figure 11:
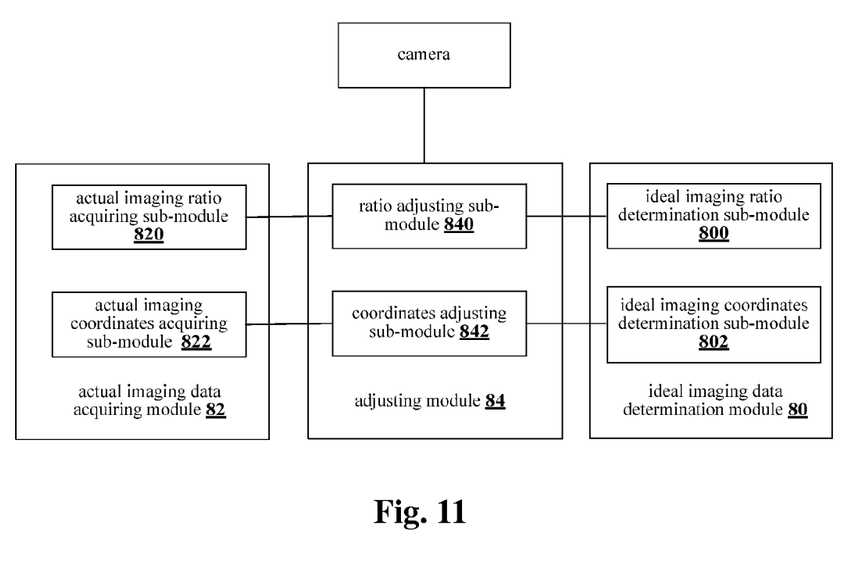
FIG. 11 is a structural diagram of an adjusting module according to the fourth embodiment of the disclosure.

Preferably, as shown in FIG. 11, the adjusting module 84 comprises: a ratio adjusting sub-module 840, configured to compare the actual imaging ratio acquired by the actual imaging ratio acquiring sub-module 820 with the ideal imaging ratio determined by the ideal imaging ratio determination sub-module 800 to acquire a ratio offset vector, judge whether the ratio offset vector exceeds a ratio threshold, and if yes, determine the range of needed adjustment of the focus of the camera corresponding to the reference object according to the ratio offset vector.

By the preferred meeting terminal above, it can be ensured that the focus of the camera can be adjusted to an ideal state.

Preferably, as shown in FIG. 11, the adjusting module 84 comprises: a coordinates adjusting sub-module 842, configured to compare the actual imaging coordinates acquired by the actual imaging coordinates acquiring sub-module 822 with the ideal imaging coordinates determined by the ideal imaging coordinates determination sub-module 802 to acquire a coordinates offset vector, judge whether the coordinates offset vector exceeds a coordinates threshold, and if yes, determine the range of needed adjustment of the shooting angle of the camera corresponding to the reference object according to the coordinates offset vector.

By the preferred meeting terminal above, it can be ensured that the shooting angle of the camera can be adjusted to an ideal state.

Through the embodiments above of the disclosure, the reference object is arranged at the intersection of the boundary of depth of field of the meeting place and the shooting boundary of the camera. The acquired actual imaging data of the reference object is compared with the predetermined ideal imaging data of the reference object by an image recognition method. The meeting terminal performs automatic adjustment for multiple cameras directly according to the result of the comparison to realize seamless connection of shooting areas of multiple cameras. The technical solutions provided by the disclosure make the basis of the adjustment of camera more objective and more accurate, and improve the efficiency of arrangement of meeting place.

Obviously, those skilled in the art should understand that the modules or steps of the disclosure may be implemented by general computing devices and centralized in a single computing device or distributed in a network consisting of multiple computing devices. Optionally, the modules or steps may be implemented by program codes executable by the computing devices, so that they may be stored in a storage device and executed by the computing device. In addition, the steps as illustrated or as described may be performed according to sequences different from those described herein in some cases, or they may be respectively made into integrated circuit modules or a single integrated circuit module. By doing so, the disclosure is not limited to any specific combination of hardware and software.

The above are only preferred embodiments of the disclosure and should not be used to limit the disclosure. For those skilled in the art, the disclosure may have various modifications and changes. Any modifications, equivalent replacements, improvements and the like within the principle of the disclosure shall fall within the scope of protection of the disclosure.

What is claimed is:

1. A method for adjusting meeting place cameras in a remote presentation meeting system, comprising:
   determining a site to be tested in a meeting place, wherein the site to be tested comprises an intersection of an ideal boundary of a depth of field of the meeting place and an ideal shooting boundary of a corresponding camera;
   determining ideal imaging data of a reference object on the site to be tested;
   acquiring, by the camera, actual imaging data of the reference object arranged on the site to be tested; and
   comparing the actual imaging data with the ideal imaging data, and determining a range of needed adjustment of the camera according to result of the comparison, wherein the actual imaging data of the reference object is rendered to accord with the ideal imaging data of the reference object.

2. The method according to claim 1, wherein determining the ideal imaging data of the reference object on the site to be tested comprises:
   determining ideal imaging ratio of the reference object on the site to be tested and ideal imaging coordinates of the reference object on the site to be tested; and
   acquiring the actual imaging data of the reference object arranged on the site to be tested comprises: acquiring actual imaging ratio of the reference object arranged on the site to be tested and actual imaging coordinates of the reference object arranged on the site to be tested.

3. The method according to claim 2, wherein determining the ideal imaging ratio of the reference object on the site to be tested comprises:
   determining the ideal imaging ratio of the reference object on a corresponding screen according to an actual size of the reference object and an actual size of the screen.

4. The method according to claim 3, wherein comparing the actual imaging data with the ideal imaging data and determining the range of needed adjustment of the camera according to the result of the comparison comprises:
   comparing the actual imaging ratio and the ideal imaging ratio to acquire a ratio offset vector; and
   judging whether the ratio offset vector exceeds a ratio threshold, and if yes, determining the range of needed adjustment of a focus of the camera corresponding to the reference object according to the ratio offset vector.

5. The method according to claim 3, wherein determining the ideal imaging coordinates of the reference object on the site to be tested comprises: determining the ideal imaging coordinates of the reference object on the site to be tested according to a display position of the site to be tested on the corresponding screen and the ideal imaging ratio of the reference object.

6. The method according to claim 5, wherein comparing the actual imaging data with the ideal imaging data and determining the range of needed adjustment of the camera according to the result of the comparison comprises:
   comparing the actual imaging coordinates and the ideal imaging coordinates to acquire a coordinates offset vector; and
   judging whether the coordinates offset vector exceeds a coordinates threshold, and if yes, determine the range of needed adjustment of a shooting angle of the camera corresponding to the reference object according to the coordinates offset vector.

7. The method of claim 1, further comprising the step of adjusting the camera based on the needed adjustment.

8. The method of claim 7, wherein said adjusting step comprises adjusting at least one of the focus and shooting angle of the camera.

9. The method of claim 4, further comprising the step of adjusting the focus of the camera based on the needed adjustment.

10. The method of claim 6, further comprising the step of adjusting the shooting angle of the camera based on the needed adjustment.

11. The method of claim 1, wherein said steps are repeated for a plurality of cameras.

12. The method of claim 7, wherein said steps are repeated for a plurality of cameras.

13. A meeting terminal, comprising:
   an ideal imaging data determination module, configured to determine ideal imaging data of a reference object on a site to be tested in a meeting place, wherein the site to be tested in the meeting place comprises an intersection of an ideal boundary of a depth of field of the meeting place and an ideal shooting boundary of a corresponding camera;
   an actual imaging data acquiring module, configured to acquire actual imaging data of the reference object arranged on the site to be tested, by the camera corresponding to the meeting terminal; and
   an adjusting module, configured to compare the actual imaging data of the reference object acquired by the actual imaging data acquiring module with the ideal imaging data of the reference object determined by the ideal imaging data determination module, and determine a range of needed adjustment of the camera according to result of the comparison wherein the actual imaging data of the reference object is rendered to accord with the ideal imaging data of the reference object.

14. The meeting terminal according to claim 13, wherein the ideal imaging data determination module comprises:
   an ideal imaging ratio determination sub-module, configured to determine ideal imaging ratio of the reference object on the site to be tested; and
   an ideal imaging coordinates determination sub-module, configured to determine idea imaging coordinates of the reference object on the site to be tested; and
   the actual imaging data acquiring module comprises:
   an actual imaging ratio acquiring sub-module, configured to acquire actual imaging ratio of the reference object arranged on the site to be tested; and
   an actual imaging coordinates acquiring sub-module, configured to acquire actual imaging coordinates of the reference object arranged on the site to be tested.

15. The meeting terminal according to claim 14, wherein the adjusting module comprises: a ratio adjusting sub-module, configured to compare the actual imaging ratio acquired by the actual imaging ratio acquiring sub-module with the ideal imaging ratio determined by the ideal imaging ratio determination sub-module to acquire a ratio offset vector, judge whether the ratio offset vector exceeds a ratio threshold, and if yes, determine the range of needed adjustment of a focus of the camera corresponding to the reference object according to the ratio offset vector.

16. The meeting terminal according to claim 14, wherein the adjusting module comprises: a coordinates adjusting sub-module, configured to compare the actual imaging coordinates acquired by the actual imaging coordinates acquiring sub-module with the ideal imaging coordinates determined by the ideal imaging coordinates determination sub-module to acquire a coordinates offset vector, judge whether the coordinates offset vector exceeds a coordinates threshold, and if yes, determine the range of needed adjustment of a shooting angle of the camera corresponding to the reference object according to the coordinates offset vector.

* * * * *